July 26, 1960 W. L. MRAZ 2,946,884

AUTOMATIC FREQUENCY CONTROL FOR RADIO RECEIVER

Filed Oct. 8, 1954 5 Sheets-Sheet 1

INVENTOR
W. L. MRAZ

BY George C. Ford

ATTORNEY

July 26, 1960 W. L. MRAZ 2,946,884

AUTOMATIC FREQUENCY CONTROL FOR RADIO RECEIVER

Filed Oct. 8, 1954 5 Sheets-Sheet 2

INVENTOR
W. L. MRAZ
BY George C. Lord
ATTORNEY

AUTOMATIC FREQUENCY CONTROL FOR RADIO RECEIVER

Filed Oct. 8, 1954 5 Sheets-Sheet 3

INVENTOR
W. L. MRAZ

BY George C. Lord
ATTORNEY

July 26, 1960 W. L. MRAZ 2,946,884
AUTOMATIC FREQUENCY CONTROL FOR RADIO RECEIVER
Filed Oct. 8, 1954 5 Sheets-Sheet 4

INVENTOR
W. L. MRAZ
BY [signature]
ATTORNEY

AUTOMATIC FREQUENCY CONTROL FOR RADIO RECEIVER

Filed Oct. 8, 1954 5 Sheets-Sheet 5

INVENTOR
W. L. MRAZ
BY [signature]
ATTORNEY

United States Patent Office 2,946,884

Patented July 26, 1960

2,946,884

AUTOMATIC FREQUENCY CONTROL FOR RADIO RECEIVER

William L. Mraz, Morris Plains, N.J., assignor to Bell Telephone Laboratories, Incorporated, New York, N.Y., a corporation of New York Filed Oct. 8, 1954, Ser. No. 461,094

1 Claim. (Cl. 250—20)

This invention relates to radio receiver circuits and more particularly to superheterodyne receivers having automatic frequency control arrangements.

An object of the invention is to provide in a superheterodyne receiver an automatic frequency control circuit that will operate indiscriminately on either image frequency.

Another object of the invention is to provide a frequency discriminator characteristic for an automatic frequency control circuit, which will have the same slope irrespective of whether the higher or lower image frequency is chosen for the automatic frequency control purpose.

A feature of the invention is an automatic frequency control circuit having two channels for the incoming signal, each channel containing a mixer to which the signal and the beating oscillator frequency are applied, said channels providing separate inputs for the frequency discriminator circuit.

Another feature of the invention are two channels for the incoming signal, each channel containing a mixer, there being a 90° displacement of either the beating oscillator frequency or the signal frequency in one mixer as compared with the other mixer.

Automatic frequency control of the local oscillator of a superheterodyne receiver is customarily based on the use of a discriminator circuit operating at the intermediate frequency.

Conventional automatic frequency control systems normally change the sign of the error discriminator characteristic as the frequency is changed to its image frequency. In such automatic frequency control systems and particularly for broad band operation, as for example in radars, considerable effort has been expended to choose the correct receiver image frequency and reject the other lest the automatic frequency control be trapped on the reverse discriminator characteristic associated with the other image frequency.

In accordance with the present invention, an automatic frequency control system is provided which maintains the same discriminator characteristic for either receiver image frequency. This is accomplished by providing the incoming signal with two paths or channels, each containing a mixer to which the signal and beating oscillator frequency are applied. In one channel, there is provided a phase shifter for shifting either the incoming signal or the beat frequency 90° in phase with respect to the other channel before application to the mixers. In the outputs of the mixers at the intermediate frequency, another 90° differential phase shift is provided. The intermediate frequencies of each channel are then applied individually and simultaneously to operate the discriminator for providing the error frequency control voltage. In some specific embodiments, the principle of the invention is applied to automatic frequency control for wave guide microwave systems and the like. Use of either image frequency response enables the search time of the automatic frequency control to be reduced to a minimum and simplifies the automatic frequency control circuit components by eliminating the rejection filters associated with conventional single channel automatic frequency control systems.

Referring to the figures of the drawing.

The usual automatic frequency control circuit for the local oscillator of a superheterodyne receiver employs a single channel containing a mixer, intermediate frequency amplifier, detector, etc., and a discriminator circuit for the local oscillator.

The variation in output voltage of the discriminator with variations in frequency of the local oscillator usually has the form shown in Fig. 1.

Figure 1A:
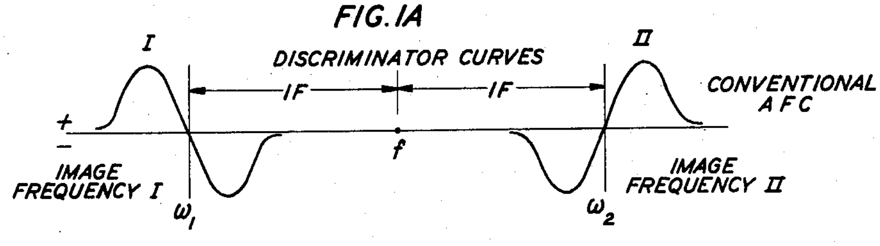
Fig. 1A shows the discriminator characteristics associated with the image frequencies in automatic frequency control systems of the prior art.
Figure 1B:
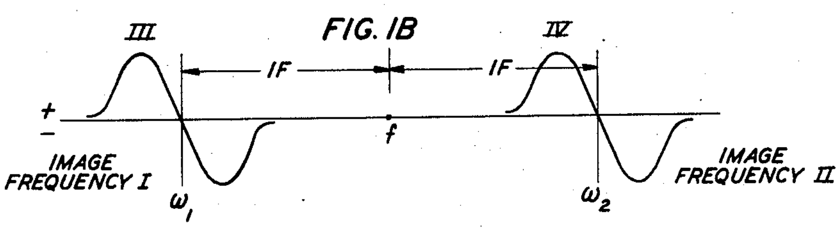
Fig. 1B shows a similar plot of the discriminator characteristics in accordance with the invention.

It will be observed from the graphs of Figs. 1A and 1B that for a beating oscillator of frequency $f$ there are two values of signal frequency ($\omega_1$ and $\omega_2$) either of which when combined with the beating oscillations $f$ will produce the desired intermediate frequency I.F. In one case I.F.$=f-\omega_1$ and in the other I.F.$=\omega_2-f$. However, an examination of the prior art discriminator curves of Fig. 1A will show that the discriminator responses at the signal frequencies $\omega_1$ and $\omega_2$ are the mirror images of each other. The reason for this is that for a signal frequency $\omega_1$ less than the oscillator frequency the intermediate frequency varies in the same direction as the oscillator frequency, while for a signal frequency $\omega_2$ greater than the oscillator frequency the variations in intermediate frequency will be in the direction opposite to the variations in oscillator frequency. It is obvious that an automatic frequency control system arranged to operate on one of the characteristics such as II will become inoperative if tuned in on the image frequency $\omega_1$ for the reason that it will operate to exaggerate any drifts in oscillator frequency rather than to correct for them.

In order to insure that the automatic frequency control circuit operates alike, irrespective of which image frequency it locks to, it is necessary to provide discriminator characteristics III and IV of Fig. 1B, which have the same slope.

Figure 2:
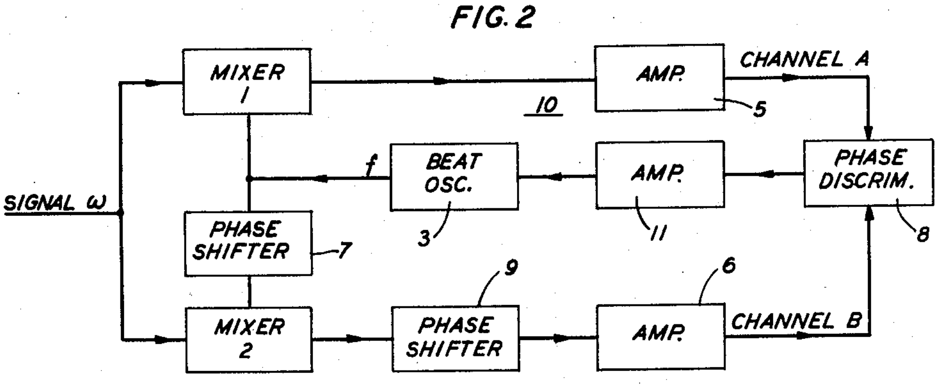
Fig. 2 is a block schematic of an automatic frequency control system in accordance with the invention.
Figure 3:
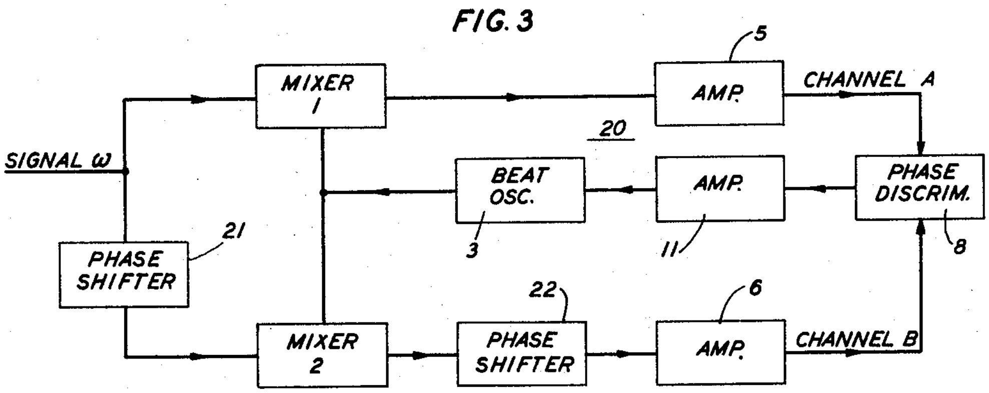
Fig. 3 is a block schematic of another form thereof.

Figs. 2 and 3 show specific embodiments of automatic frequency control circuits, which provide discriminator characteristics III and IV having the same slope by the use of two channels for the incoming signal and two mixers, to which the beating frequency and signal are applied.

It may be shown mathematically and experimentally that when a 90° phase shift is added in either the signal or the beating oscillator path of one of two mixers fed by a common beating oscillator, the phase of the output of this mixer will lead that of the other mixer by 90° at one image frequency and lag it by 90° at the other image frequency.

The result of this effect is that the output of this mixer will exhibit a phase change of 180° as its inputs go from the condition for one image frequency to that for the other. When the outputs of the two mixers are fed to a discriminator, this 180° phase shift in one of the inputs to the discriminator produces a phase reversal in its output characteristic. Whereas the discriminator outputs for the two image frequencies will be as shown in curves I and II (Fig. 1A) when the inputs are in the same phase for the two conditions, they will in contradistinction thereto assume the characteristics shown in curves III and IV (Fig. 1B) in which the slopes with respect to frequency are the same when the 180° phase change aforementioned produces a reversal in the polarity of one output in accordance with the present invention. The 90° phase shift provided in channel B is necessary to make the two inputs to the discriminator have a quadrature phase relation at the cross-over frequency.

Referring to Fig. 2, incoming signals $\omega$ are divided into two separate branches or channels A, B and applied cophasally to mixers 1, 2 or well-known construction. A beating oscillator 3 provides a frequency $f$, which is applied to each mixer. The results of each mixing process are the derived sideband frequencies from which it is desired to select the lower sideband in the respective intermediate frequency amplifiers.

It is important to maintain substantially fixed the frequency difference or lower sideband ($\omega-f$ or $f-\omega$) between the incoming signal $\omega$ and the beating frequency $f$, so as to maintain the intermediate frequency output of mixers 1, 2 substantially constant at a predetermined or desired frequency. It is the function of the automatic frequency control to maintain the output frequency of the mixers 1, 2 in the center of the intermediate frequency pass band.

Frequency drifts in the incoming signal $\omega$ or in the beating oscillator 3 will tend to cause the converted signal from the mixers 1, 2 to drift out of said pass band.

Hence, the automatic frequency control circuit 10 will perform in general two functions:

(1) It will stabilize the beating oscillator 3 against any tendency to frequency drifts within itself;

(2) It will introduce a change in the beating oscillator corresponding to a drift in the signal $\omega$, both in magnitude and direction of change.

The local or beating oscillator 3 is provided with an automatic control circuit, which is responsive to variations in the intermediate frequency from the desired, constant frequency $\omega-f$. Variations in both the signal and beat frequency may be compensated for by suitable regulation of the beat oscillator by the control circuit, which includes the intermediate frequency amplifier, the discriminator circuit, and a reactance tube or other oscillator control.

It will be noted in Fig. 2 that channel A transmits the incoming signal $\omega$ to mixer 1, and amplifies the output of the mixer 1 in intermediate frequency amplifier 5, whence it is applied to the discriminator 8.

It will be further noted that channel B transmits the signal $\omega$ cophasally to mixer 2. However, the beating oscillator frequency $f$ is applied to mixer 2 with a 90° phase displacement by virtue of phase shifter 7, as compared to the way it is applied to mixer 1. Furthermore, the output of mixer 2 is again shifted in phase 90° at the intermediate frequency in channel B by the phase shifter 9 and then amplified by the intermediate frequency amplifier 6.

The nature of the phase shifter 9 will be described with greater particularity in Figs. 4, 5, 6.

Thus the phase-frequency discriminator 8 is provided with two inputs derived from channels A and B respectively, cophased for one image frequency and in phase opposition for the other image frequency. The output of discriminator 8 is amplified by amplifier 11 and fed into a suitable frequency control circuit to effect frequency regulation of the beat oscillator 3.

Since there are two image frequencies, i.e., a higher and a lower frequency in the superheterodyne receiver, the slope of the discriminator characteristic in the prior art has generally been opposite, depending on which image frequency is chosen for automatic frequency control. This is characteristic of the single channel type of automatic frequency control whose discriminator characteristic is the curve I (Fig. 1A). When the frequency control starts with the image frequency, then its discriminator characteristic has the shape of curve II. As is apparent, the curves I and II are alike except that the slopes at corresponding points thereof are opposite in sign.

For the two channel (A, B) system described herein (Figs. 2 and 3) in accordance with the invention, the discriminator characteristic has the same slope for either the higher or lower image frequency of the superheterodyne receiver, as shown by curves III and IV, respectively (Fig. 1B). It will be apparent that the curves are identical and the slopes at corresponding points are alike.

Referring to the schematic circuit of Fig. 3, the automatic frequency control system 20 is similar in principle to that disclosed in Fig. 2. Instead of applying the incoming signal $\omega$ cophasally to mixers 1 and 2 of channels A and B, respectively (Fig. 2), the signal is applied in Fig. 3 to the mixers 1, 2, respectively, as components 90° out of phase due to the action of phase shifter 21. The shifted component of the signal $\omega$, which is transmitted in channel B, is further subjected to another 90° phase shift at the intermediate frequency by phase shifter 22.

The net effect of these two phase shifts is that the signals in channels A and B, which are applied as inputs to the phase-frequency discriminator 8, are in phase for one image frequency and out of phase for the other image frequency.

On comparing the schematic circuits of Figs. 2 and 3, it will be apparent that a differential phase shift of 90° is provided in channels A and B at the intermediate frequency. The intermediate frequency phase shifters 9 and 22 may take various forms, for example, as shown in Figs. 4, 5, 6.

Figure 4:
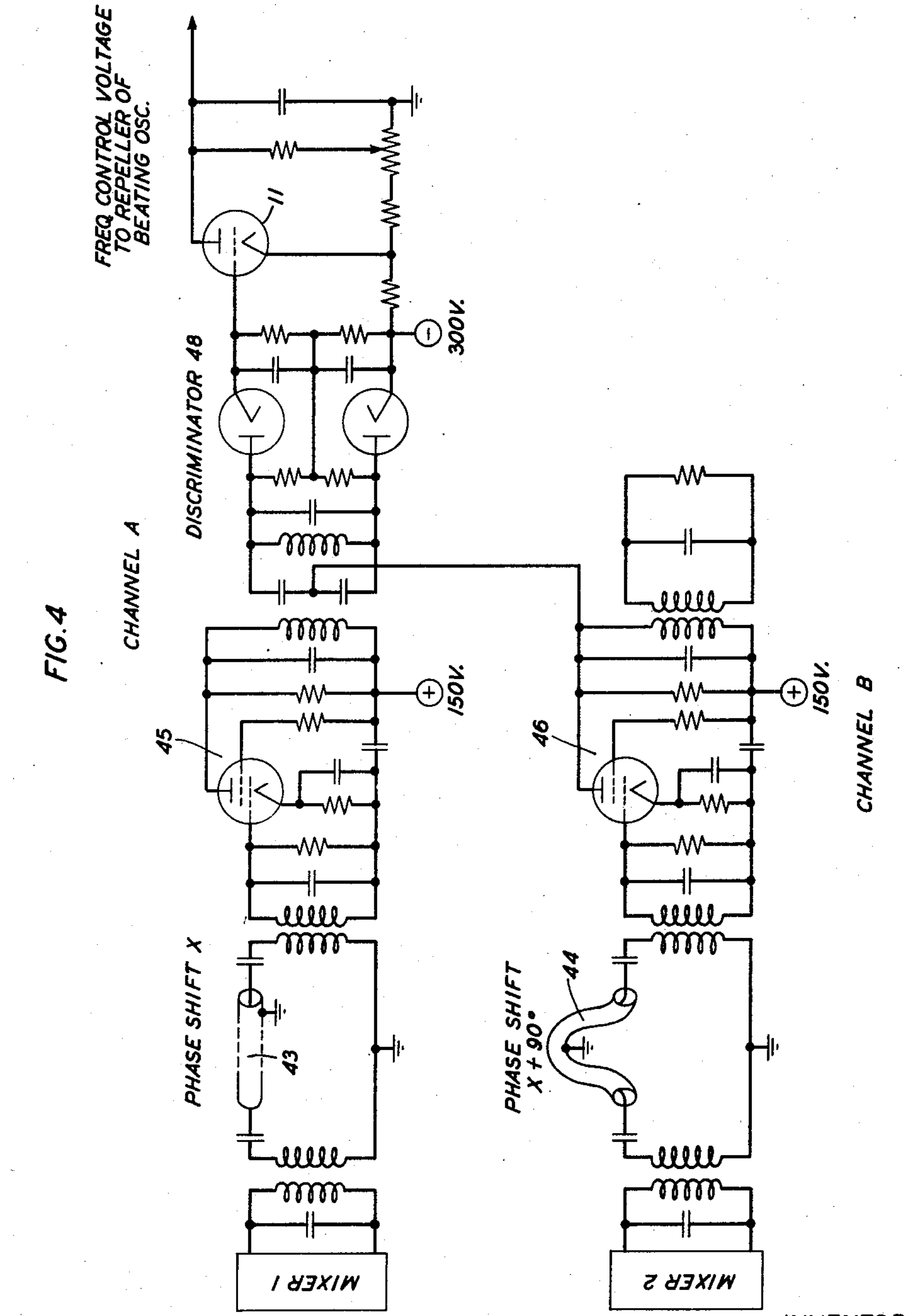
Figs. 4, 5, 6 are schematic circuits of automatic frequency control systems adapted for microwave systems.
Figure 5:
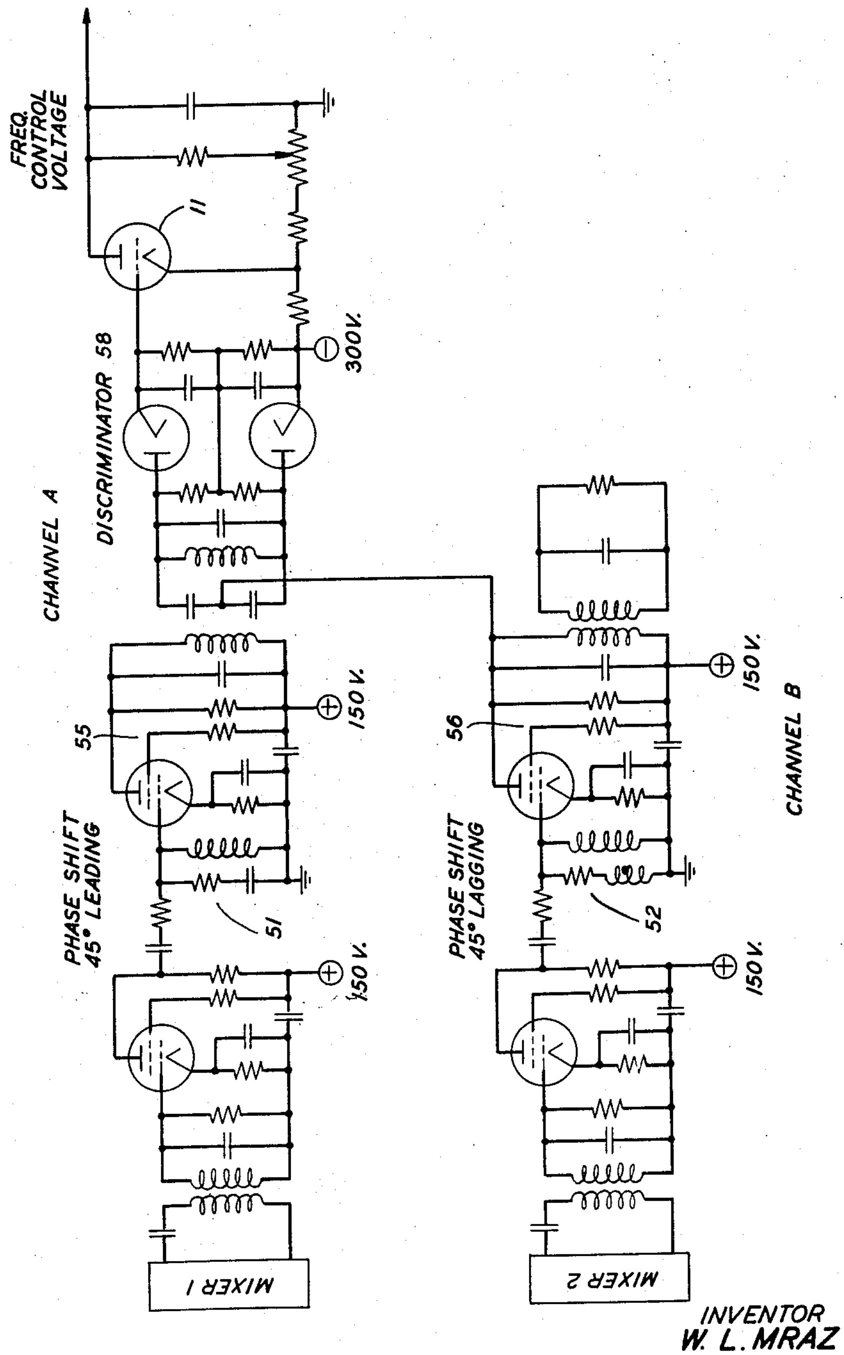
Figure 6:
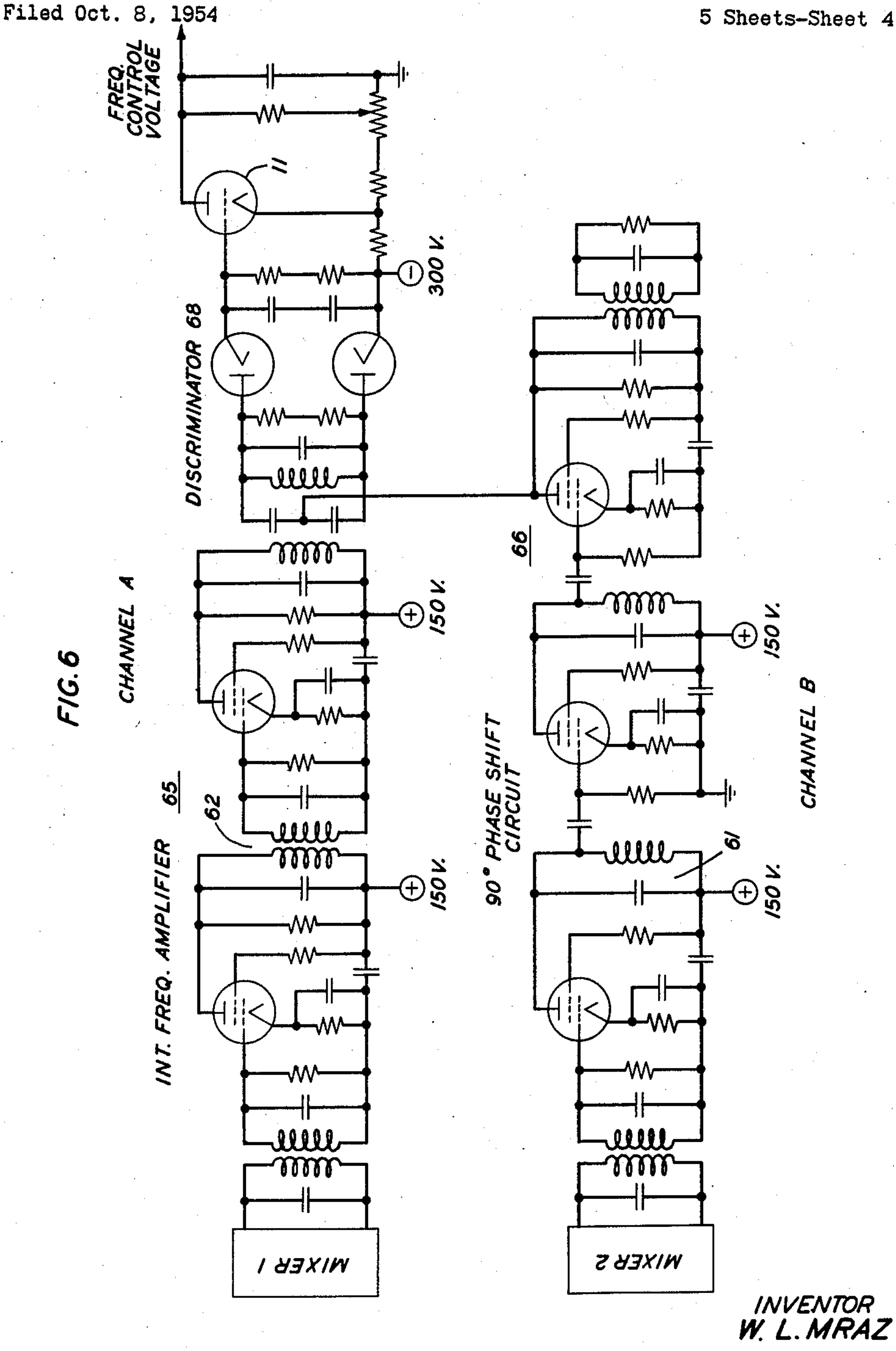
Figures 7, 8:
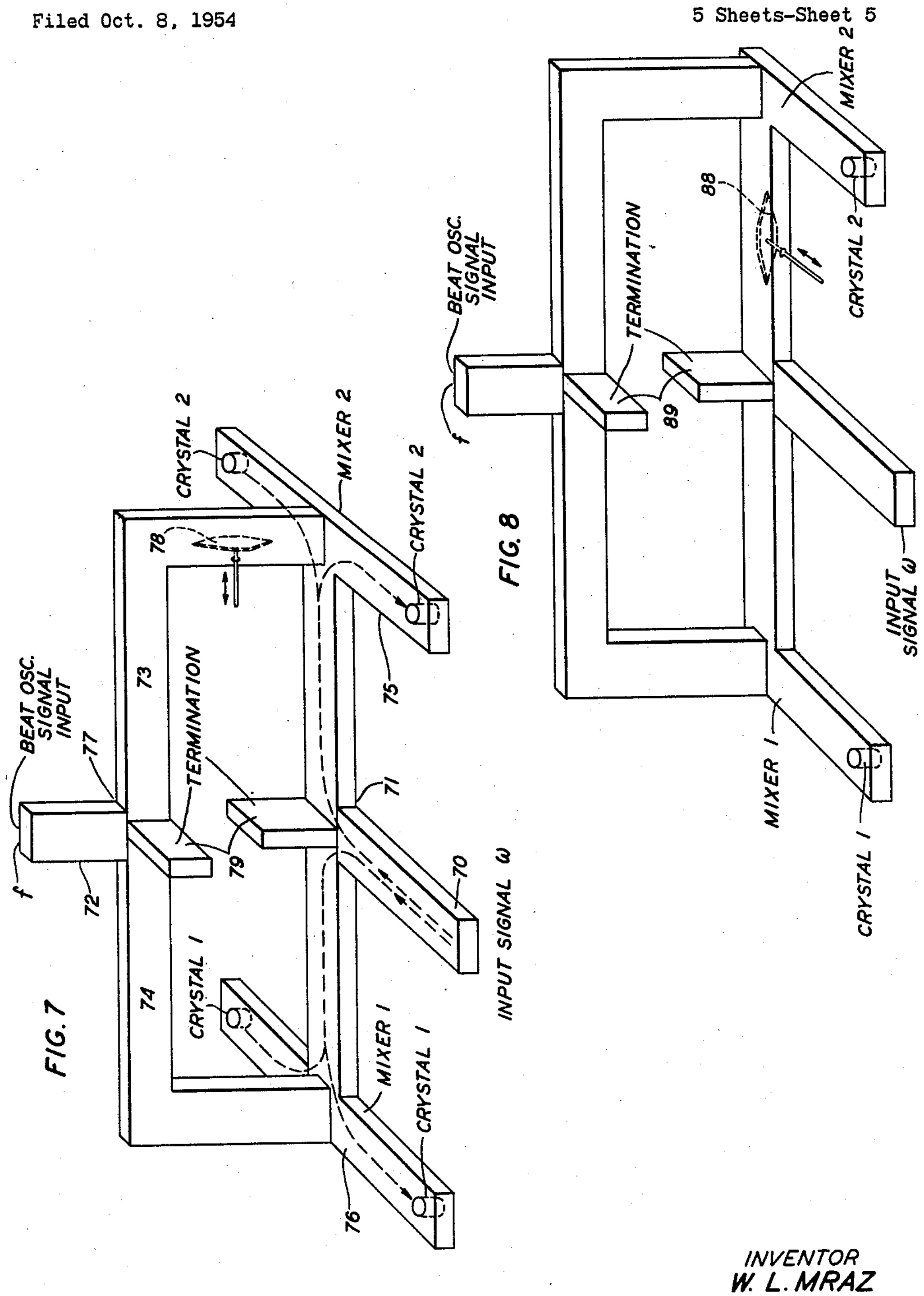
Fig. 7 is a waveguide mixer designed for the automatic frequency control systems of Figs. 4, 5, or 6.
Fig. 8 is another form of waveguide mixer for the automatic frequency control systems of Figs. 4, 5, or 6.

The circuits of Figs. 4, 5, 6 illustrate automatic frequency controlled superheterodyne receivers adapted for radar or other use. The incoming signal $\omega$ is a conventional radar signal, which is picked up by microwave antenna (not shown) and applied to mixers 1, 2. For the frequencies of operation concerned, the mixers preferably employ sensitive silicon crystal rectifiers (IN23) or the like in balanced or single sided arrangement, to which are also applied the local oscillator frequency $f$. Figs. 7 and 8, described subsequently, illustrate the radio frequency and beating oscillation circuits to be employed with the intermediate frequency circuits of either Figs. 4, 5, or 6.

The purpose of the automatic frequency control circuit here illustrated is to maintain the frequency difference between the radar signal $\omega$ and the local oscillator $f$ equal to the pretuned frequency of the intermediate frequency amplifiers coupled to the output circuits of the mixers 1 and 2.

Referring particularly to Fig. 4, the outputs of mixers 1 and 2 undergo a relative 90° phase shift by the action of sections of coaxial cable 43, 44, respectively. The section 43 provides a phase displacement of "X" degrees in one output, whereas the section 44 provides a phase displacement of "$X+90°$." The over-all relative phase displacement at the intermediate frequency is accordingly a quadrature phase shift of 90°.

The intermediate frequencies, shifted in phase as described, are then amplified respectively in channels A and B, respectively, by the 404A amplifiers 45, 46 tuned to the intermediate frequency. Thence they are applied to the intermediate frequency discriminator circuit 48 of conventional design and operation to provide the necessary automatic frequency control voltages. These are applied to a microwave beating oscillator, such as a 2K25 klystron having a repeller electrode to vary its frequency for automatic frequency control regulation.

Although described particularly for radar application, the circuits of Figs. 4, 5, 6 may be used generally as in microwave communication systems, for example, radio relay and the like.

It is to be noted that with reference to Figs. 4, 5, 6, the mixers, discriminator circuits, intermediate frequency amplifiers, frequency control amplifiers, and beating oscillators are similar.

Referring to Fig. 5, the differential 90° phase shift at the intermediate frequency is obtained by the use of resistance-capacitance (R–C) and resistance-inductance (R–L) circuits 51, 52, respectively, and their phase characteristics for providing 45° leading phase shift in channel A and a 45° lagging phase shift in channel B at the intermediate frequency. The intermediate frequency amplifiers 55, 56 apply the phase shifted signals to the discriminator 58 in similar fashion to Fig. 4.

Referring to Fig. 6, the 90° phase shift is obtained by using cascaded single tuned circuits 61 in channel B, and double tuned circuits 62 in channel A, which results in a relative 90° shift, capable of being held over a 10 percent bandwidth frequency. The tuned circuits are tuned to the intermediate frequency and are associated with the intermediate frequency amplifiers 65, 66, as shown in Fig. 6. The outputs of the amplifiers 65 and 66 are applied as shown to the discriminator 68, which provides the control voltage for the local klystron oscillator.

Figs. 7 and 8 show microwave mixer circuits with wave guide systems for feeding microwave power into the crystal mixers. Fig. 7 shows the input circuits in the arrangement of the block diagram of Fig. 1 with the phase shift in the beating oscillator circuit. Fig. 8 shows the arrangement of Fig. 2 with the phase shift in the signal input leads.

Referring to Fig. 7, the incoming signal $\omega$ is received at the input wave guide 70 and is divided cophasally in the wave guide hybrid 71 to be applied to mixers 1 and 2. The hybrid 71 is of the well-known type disclosed in United States Patent Number 2,445,896, issued July 27, 1948, to W. A. Tyrrell, and through the conjugacy that it provides, it prevents interaction between the mixers supplied therethrough. For this purpose, the E plane arm is provided with a termination 79 to match the impedance provided by the H plane arm.

The beating oscillations of frequency $f$ are applied to the wave guide arm 72, and thence divided between two paths 73 and 74 through a second wave guide hybrid 77 into two parallel paths leading to the respective mixers 1, 2. A differential phase shift of 90° between the beating oscillations to the two mixers is provided by the arms 73 and 74. The desired phase shift may be provided by the use in one arm 73 of a phase shifting vane or the like, as shown in United States Patent Number 2,629,773, issued to N. I. Hall et al., February 24, 1953.

The wave guide mixers 1, 2 as shown, may be of the type disclosed in United States Patent Number 2,679,582, issued May 25, 1954, to C. F. Edwards. The input signal $\omega$ from the dividing hybrid 71 is introduced into each through the H plane arm and the beating oscillations $f$ through the E plane arms connected to the wave guides 73 and 74. The crystals are located in the arms 75 and 76. The resulting intermediate frequency is taken off in a well-known manner by appropriate circuits, not shown.

Fig. 8 shows another form of wave guide input and mixer circuit corresponding in principle to the arrangement shown in block form in Fig. 3, wherein the incoming signal $\omega$ is applied to the mixers 1, 2 with a relative 90° phase shift, and the beating oscillations are in phase. The component of the signal $\omega$ directed to mixer 2 is displaced 90° in phase relative to the phase of the component directed to mixer 1 by a vane type phase shifter similar to that used in Fig. 7. The beat oscillations $f$ are applied cophasally to the mixers 1 and 2, respectively.

The microwave systems of either Figs. 7 or 8 may be used with any of the intermediate frequency systems shown in Figs. 4, 5, 6 for the automatic frequency control. In addition, while Fig. 7 shows balanced mixers and Fig. 8 shows single sided mixers, these may obviously be interchanged, as may be suggested by the design requirements of any particular system.

It should be understood by those skilled in the art that the principles underlying the invention described herein may also be applied to angular coordinate discriminator curves of radio locating equipment, such as disclosed, for example, in the United States Patent Number 2,467,361 of J. P. Blewett, issued April 12, 1949. In its application to angle tracking radars, these principles and similar circuits would permit automatic angle tracking on either image frequency.

What is claimed is:

In a superheterodyne radio receiver, an automatic frequency control system for permitting indiscriminate choice of either image frequency comprising a source of signal oscillations, an oscillator for supplying beating oscillations differing from the frequency of said signal oscillations by an intermediate frequency, a first mixer having supplied thereto oscillations from each of said sources, a second mixer having supplied thereto oscillations from each of said sources, means for producing a phase shift in the oscillations from one of said sources supplied to said second mixer so that said oscillations from said one of said sources are in phase quadrature with the oscillations from said one source supplied to said first mixer, means for selecting from the output of each mixer modulation products at said intermediate frequency to the exclusion of other modulation products, means for producing a constant phase difference of ninety degrees between the selected intermediate frequency products from the two mixers, a frequency discriminator, means for supplying to said discriminator the selected and phase modified intermediate frequency modulation products from said mixers, and means responsive to the output of said discriminator for regulating the frequency of said oscillator for supplying beating oscillations to maintain said intermediate frequency constant.

References Cited in the file of this patent

UNITED STATES PATENTS

| | | |
|---|---|---|
| 2,044,745 | Hansell | June 16, 1936 |
| 2,310,692 | Hansell | Feb. 9, 1943 |
| 2,481,659 | Guanella | Sept. 13, 1949 |
| 2,522,371 | Guanella et al. | Sept. 12, 1950 |
| 2,540,333 | Hugenholtz | Feb. 6, 1951 |
| 2,639,326 | Ring | May 19, 1953 |
| 2,691,734 | Beck et al. | Oct. 12, 1954 |